(12) United States Patent
Schneider et al.

(10) Patent No.: US 7,571,936 B2
(45) Date of Patent: Aug. 11, 2009

(54) SCREW CONNECTION ELEMENT AND PROTECTIVE SLEEVE THEREFOR

(76) Inventors: Harald Schneider, Otto-Haesler-Strasse 10, D-34134 Kassel (DE); Martin Schneider, Bergstrasse 12, D-34277 Fuldabrueck (DE); Uwe Balshuesemann, Am Deich 19, D-40547 Duesseldorf (DE)

(*) Notice: Subject to any disclaimer, the term of this patent is extended or adjusted under 35 U.S.C. 154(b) by 255 days.

(21) Appl. No.: 10/563,394

(22) PCT Filed: Jul. 15, 2004

(86) PCT No.: PCT/DE2004/001556

§ 371 (c)(1),
(2), (4) Date: Apr. 5, 2006

(87) PCT Pub. No.: WO2005/010420

PCT Pub. Date: Feb. 3, 2005

(65) Prior Publication Data

US 2006/0237966 A1    Oct. 26, 2006

(30) Foreign Application Priority Data

Jul. 17, 2003 (DE) .............................. 203 11 834 U
Dec. 30, 2003 (DE) .............................. 203 20 226 U

(51) Int. Cl.
*F16L 15/00* (2006.01)
(52) U.S. Cl. .................... 285/45; 285/333; 285/390; 138/96 R
(58) Field of Classification Search ................ 285/45, 285/333, 334, 53, 390; 138/96 T, 96 R; 411/82.3, 411/82.2, 82
See application file for complete search history.

(56) References Cited

U.S. PATENT DOCUMENTS

| | | | | |
|---|---|---|---|---|
| 2,167,235 A * | 7/1939 | Engstrom | .................. | 138/96 T |
| 2,238,642 A * | 4/1941 | Hicks | ........................ | 138/96 T |
| 2,251,897 A * | 8/1941 | Severn | ..................... | 138/96 T |
| 2,319,124 A * | 5/1943 | Goldberg et al. | ........... | 138/96 T |
| 2,378,710 A * | 6/1945 | Krause | ..................... | 138/96 T |
| 2,523,930 A * | 9/1950 | Unke | ......................... | 138/96 T |
| 2,543,960 A * | 3/1951 | Elmer | ....................... | 138/96 T |
| 2,632,478 A * | 3/1953 | Ronfeldt | .................... | 138/96 T |
| 2,701,584 A * | 2/1955 | Philips | ...................... | 138/96 T |
| 3,061,455 A * | 10/1962 | Anthony | ..................... | 411/258 |
| 3,472,301 A * | 10/1969 | Pearce, Jr. | ................... | 411/258 |
| 3,687,493 A * | 8/1972 | Lock et al. | .................. | 285/333 |
| 4,033,380 A * | 7/1977 | Weber | ....................... | 138/96 T |
| 4,232,712 A * | 11/1980 | Squires | ....................... | 138/109 |
| 4,263,832 A * | 4/1981 | Lang et al. | ..................... | 411/15 |

(Continued)

FOREIGN PATENT DOCUMENTS

DE    1 600 06    4/1983

(Continued)

*Primary Examiner*—David E Bochna
(74) *Attorney, Agent, or Firm*—Michael J. Striker

(57) ABSTRACT

A screw connection element having an outer threaded portion and a sealing means (19) which is disposed in the threads thereof is described. According to the invention, the screw connection element is provided with a protective covering (18) which surrounds the outer threaded portion, is produced from a flexible material and is intended for retaining the sealing means (19) in the threads. In addition, the invention relates to the protective covering (18) itself (FIG. 7).

17 Claims, 4 Drawing Sheets

U.S. PATENT DOCUMENTS

| | | | | |
|---|---|---|---|---|
| 4,428,982 A | * | 1/1984 | Wallace | 427/202 |
| 4,545,712 A | * | 10/1985 | Wallace | 411/258 |
| 4,757,595 A | * | 7/1988 | Fraering, Jr. | 29/447 |
| 5,260,100 A | * | 11/1993 | Day | 427/386 |
| 5,303,743 A | * | 4/1994 | Vincent | 138/96 T |
| 5,452,977 A | * | 9/1995 | Terrizzi | 411/82.5 |
| 6,361,083 B1 | | 3/2002 | Riesselmann et al. | |
| 6,896,462 B2 | * | 5/2005 | Stevenson et al. | 411/82 |
| 7,168,707 B2 | * | 1/2007 | Casey et al. | 277/314 |
| 7,195,437 B2 | * | 3/2007 | Sakamoto | 411/82.3 |

FOREIGN PATENT DOCUMENTS

| | | |
|---|---|---|
| EP | 0 242 796 | 10/1987 |
| EP | 0 523 775 | 1/1993 |
| EP | 0 544 111 | 6/1993 |
| EP | 0 751 328 | 1/1997 |
| EP | 1 004 804 | 5/2000 |

* cited by examiner

SCREW CONNECTION ELEMENT AND PROTECTIVE SLEEVE THEREFOR

CROSS-REFERENCE TO RELATED APPLICATION

The invention described and claimed herein below is also described in German Patent Application DE 10 2003 11 834.0 filed on Jul. 17, 2003. This German Patent Application, provides the basis for a claim of priority of invention under 35 U.S.C. 119(a)-(d).

BACKGROUND OF THE INVENTION

The present invention relates to a screw connection element and to a protective covering applicable on an outer thread portion thereof.

Pipes, components having pipe-like connections, valves, fittings or the like and also connection and extension parts therefor are connected to each other in every respect by screw connections in particular in the sanitary and heating field but also in machine construction. For this purpose, one of the parts to be connected has an outer threaded portion and the other part a corresponding inner threaded portion. Since as a rule fluid in the form of a liquid or a gas (e.g. water or air) flows through both parts, the screw connections must fulfil not only mechanical strength requirements but must also be fluid-tight at normal pressures (e.g. up to 10 bar).

Whilst fulfilling the strength requirements does not represent a problem, the production of a long-lasting durable seal still poses difficulties. It is in fact generally normal to cover the outer threaded portions before joining with hemp fibres, plastic material (Teflon) strips or other sealing means, yet this measure, irrespective of whether the cooperating threaded portions are made of metal or plastic material, has proved to be inadequate. A main reason for this resides in the fact that the quality of the seal usually depends upon the care with which the personnel applying the sealing means and then producing the screw connection operate. In the commercial field, it can be assumed that in fact good seals are obtained in most cases, but the number of unserviceable seals continues to be far too great. In addition, it is frequently not taken into account that screw connections must be unscrewed again often by up to 90° after tightening in order for example to straighten up a fitting which is sitting at an angle and therefore disposed in an optically unpleasant manner. Unscrewing of this type results not infrequently in a lack of seal in the initially tight screw connection.

It is known in order to avoid problems of this type to provide one of the threaded portions with an integrated sealing means in the factory, in that for example the threads are produced at least partially from an elastic material, such as e.g. PEX or EPDM (EP 1 004 804 A1) or a threaded portion is provided with an annular groove and a sealing element inserted therein (EP 0 544 111 B1, EP 0 751 328 A1). In addition, separate sealing elements are known which have respectively one stop ring which can be screwed onto an outer threaded portion and a sealing mass which is fixed on the latter, can be screwed onto the outer threaded portion and is made of rubber, plastic material (Teflon) or the like, which is squeezed during production of the screw connection between the stop ring and the inner threaded portion (EP 0 523 775 A1). However all these measures have to date not proved to be satisfactory.

SUMMARY OF THE INVENTION

Starting therefrom, the object underlying the present invention is to produce a screw connection element and a protective covering suitable therefor, by means of which a long-lasting sealed screw connection can be produced in a simple manner, which can also be unscrewed by up to 90° without becoming unsealed, by means of which furthermore a sealing effect is achieved which is essentially independent of the person producing the screw connection and by means of which a factory pre-assembly can be undertaken according to requirement or a separate accessory for repair works or the like can be produced.

The invention has the advantage that all sealing materials which have proved to be suitable can be used as sealing means, in particular hemp fibres. If these are intended to be applied already in the factory in order to relieve the respective manual worker or the like of this work, the protective covering according to the invention serves in particular for the purpose of retaining and securing the sealing means in the threads of the screw connection element also during transportation and storage. On the other hand, if it is desired that a simple and secure application of the sealing means is ensured even during repair works or the like, the sealing means is expediently integrated into the protective covering and the latter is in addition configured such that it can be screwed subsequently or at any, desired, time onto an outer threaded portion. Irrespective of the type of production, the protective covering according to the invention ensures in addition that a screw connection once produced can be unscrewed if necessary by at least 90° without the connection becoming unsealed. It is also advantageous that no additional tools are required for applying a sealing means at the building site. A further advantage of the invention resides finally, in the fact that the connection can be retained extensively germ-free in a simple manner in that for example fine threads made of oligodynamically acting metals, such as copper, are inserted in the sealing means.

Further advantageous features of the invention are revealed in the sub-claims.

The invention is described subsequently in more detail with embodiments in conjunction with the accompanying drawings, in which the same parts are provided with the same reference numbers. There are shown:

DESCRIPTION OF THE PREFERRED EMBODIMENTS

Figure 1:
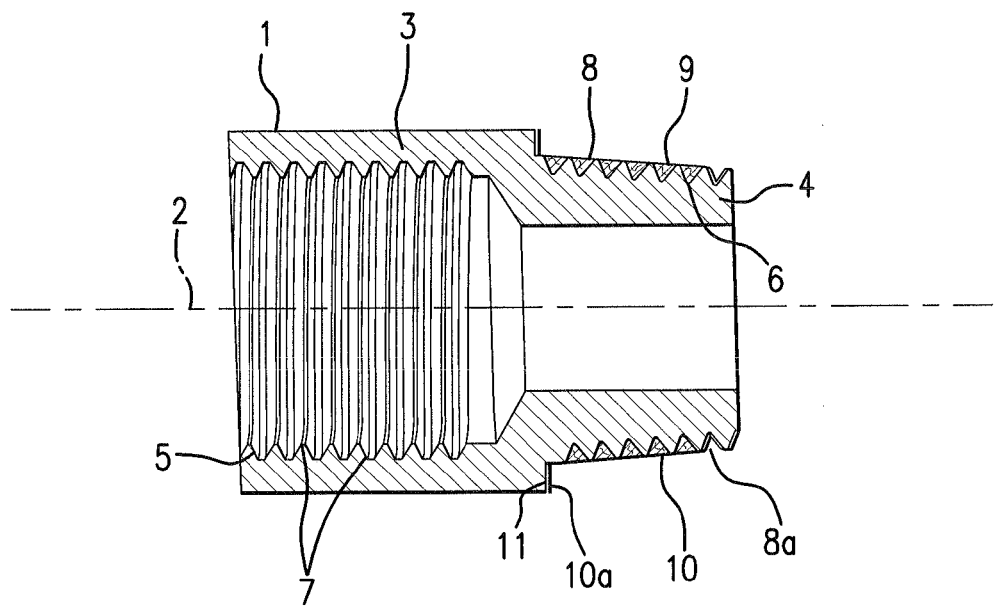
FIG. 1 a longitudinal section through a first embodiment of a screw connection element according to the invention.

FIG. 1 shows a screw connection element 1 in the form of a tubular nipple or extension part produced preferably from metal. The screw connection element 1 has a longitudinal axis 2 and two connection ends 3 and 4. The connection end 3 is provided with an inner threaded portion 5 and the connection end 4 with an outer threaded portion 6. Each threaded portion 5, 6 has, in the normal manner, a plurality of threads 7 or 8 which are formed by channels extending about the longitudinal axis 2 in the helical line and are disposed between ribs which have for example essentially triangular cross-sections.

The threads 8 of the outer threaded portion 6 are provided with a sealing means 9 which is applied in the factory and comprises in the embodiment hemp fibres which are twisted together and are indicated by respectively six small circles. It is thereby clear that this concerns as usual preferably a fairly long hemp fibre bundle which is inserted into the threads 8 from one or other end of the outer threaded portion 6 and extends thus about the longitudinal axis 2 like said threads in the helical line.

According to the invention, the screw connection element 1 is provided further with a protective covering 10 which is produced from a flexible material, preferably a plastic material, in the manner of a sheath and has an essentially cylindrical configuration and is disposed coaxially on the outer threaded portion 6. The protective covering 10 has an inner diameter which corresponds essentially to the outer or nominal diameter of the outer threaded portion 4 so that it tightly surrounds the outer circumferential face of the outer threaded portion 6. As a result, the sealing means 9 is retained firmly and securely in the threads 6 as long as the protective covering 10 is disposed on the outer threaded portion 6. The protective covering 10 expediently has such an axial length that it covers all the threads 8 filled with the sealing means 9.

On the rear side, the protective covering 10 is provided preferably with a radially outwardly protruding mounting flange 10a which, in the screwed-on state according to FIG. 1, abuts on a radially outwardly extending shoulder 11 which is provided on the rear end of the outer threaded portion 6. In addition, it is particularly expedient to secure the mounting flange 10a with an adhesive on the shoulder 11 in order that the protective covering 10 cannot be stripped unintentionally off the outer threaded portion 6.

On a front end of the connection end 4, a thread 8a of the outer threaded portion 6 remains free of sealing means 9 in a development of the invention. At this position, the protective covering 10 is deformed such by shrinkage effected after heating or by radial compression produced with a pliers-like tool such that it enters into the thread 8a and preferably abuts on the walls thereof, as FIG. 1 indicates clearly. As a result, a form-fitting connection is produced between the connection end 4 and the protective covering 10 in the direction of the longitudinal axis 2.

The protective covering 10 can comprise for example a sheath produced by deep-drawing, which has a circumferential wall which is a few hundredths of a millimeter thick and is produced for example from PA 6, PET, PTFE or other hygroscopic materials, deep-drawable films or the like. Alternatively, it can however also be produced for example from hemp or cellulose. For this purpose, a liquefied cellulose mass obtained by melting hemp fibres could be painted on a mandrel with a layer thickness of up to a few tenths of a millimeter and be withdrawn from the latter after drying as a finished moulded part. In order to facilitate this process, the mandrel could firstly be coated with a separating agent. A sheath produced in this manner, which has a paper-like consistency after drying can also be screwed onto the outer threaded portion 6 subsequently.

The protective covering 10 has been described to date as a separately produced par, which is connected only later to the connection end 4. This has the advantage that the screw connection elements 1 and the protective coverings 10 can be produced by different manufacturers and the protective coverings 10 can be applied on the connection ends 4 wherever the sealing means 9 is inserted in the threads 8. Alternatively, the protective covering 10 can be produced however also as an integral element connected securely from the outset to the outer threaded portion 6. For this purpose, for example a liquid plastic material or cellulose mass is placed in an immersion bath and the connection end 4 is soaked in this immersion bath so that the sheath material abuts securely on the outer circumferential wall of the connection end 4 and thereby penetrates partially also into the threads 8 and 8a. In this case, the screw connection element 1 and the protective covering 10 form a quick prefabricated unit.

Irrespective of the described production method, the advantage is produced that the protective covering 10 can be applied after introduction of the sealing means 9 and then protects the outer threaded portion 6 not only from undesired detachment of the sealing means 9 but also from mechanical damage or damage to the sealing means which could result as a consequence of handling of the screw connection elements 1 as bulk material during transportation, during storage or during any other use resulting from the actual application.

Furthermore, the protective covering 10 ensures that the user, when joining the screw connection element 1 for instance with a second such screw connection element 14 (FIG. 2) is not set the task of having to introduce the sealing means 9 himself into the threads 8. Rather the user needs only to screw in the connection end 4 provided with the protective covering 10 by its front end first into a connection end 16 of the screw connection element 14 to be joined, which latter connection end is provided with a corresponding inner thread 15. The flexible protective covering, 10 is thereby pressed by the inner threaded portion 15 together with the sealing means 9 into the threads 8. Should the protective covering 10 during further screwing in of the threaded portions 6 and 15 be torn off as a result of the effect of the sharp-edged ribs forming the threads this does not then imply a disadvantage. Because, as can be detected in FIG. 2, the sealing means 9 has then, on the one hand, already penetrated between the front threads and been pressed into these whilst, on the other hand, the protective covering 10, as a torn-off part 10b in FIG. 2 indicates, is only stripped off the outer threaded portion 6 gradually so that the sealing means 9 enters securely into the intermediate spaces between the threaded portions and consequently ensures the required seal. When using hemp fibres as sealing means, this is all the more true as the initial ends of these fibres, after bringing together the first threads of parts 1 and 14, are already securely clamped between these and can then no longer be pushed away or pulled away.

The protective covering 10 is expediently produced from a soft and so flexible material that it can readily enter together with the sealing means 9 into the threads of the parts to be joined during production of the screw connection. It would however also be possible to use harder materials and to remove the protective covering 10 on the building site directly before joining the threaded parts 8 and 15. Even in such a case, it is ensured that the sealing means 9 is disposed with the required distribution and in the required quantity in the threads 8 of the outer threaded portion 6 before the screw connection is produced.

In addition to the described measures, it can be provided to wet the sealing means before application with a permanently elastic glue or any suitable adhesive in order to retain it securely in the threads 8 before application or if necessary also after stripping off the protective covering 10. However, care should be taken thereby that, in the case of screw connection elements 1 or 14 for drinking water pipes or the like, only materials suitable for food are used. This also applies with respect to a glue used for instance to secure the protective covering 10 on the shoulder 11 (FIG. 1).

Figure 3:
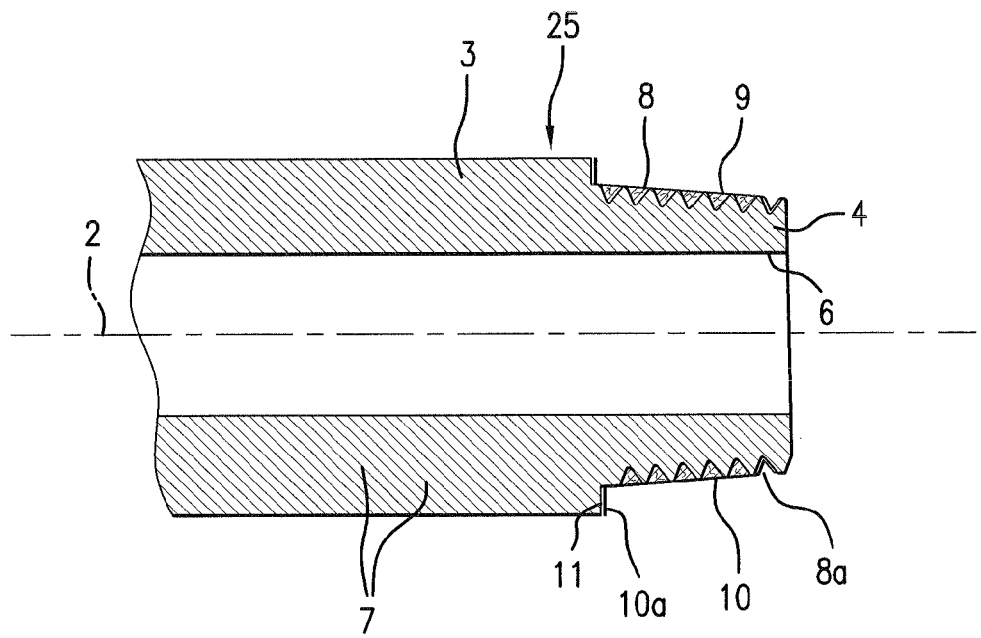
FIG. 3 a longitudinal section through a second embodiment of a screw connection element according to the invention.

The embodiment of a screw connection element 25 according to the invention illustrated in FIG. 3 differs from that according to FIG. 1 in that it has only one outer threaded portion 6. The screw connection element 25 is thereby configured as the end of a fitting unit which can be connected for example to a wall-secured supply pipe 26 (FIG. 4) for water or the like.

Figure 2:
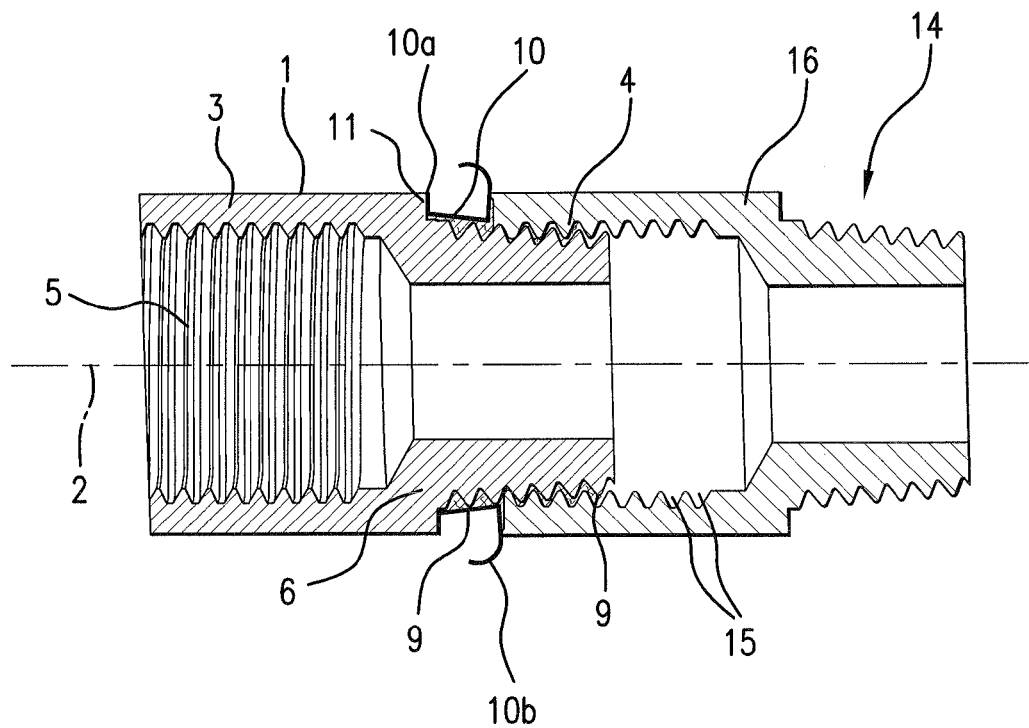
FIG. 2 in a scale reduced relative to FIG. 1, a longitudinal section through a screw connection produced with the screw connection element according to FIG. 1.

The supply pipe 26 thereby has at one end an inner threaded portion 15 adapted to the outer threaded portion 6 corresponding to FIG. 2. Via the threaded portions 15, 6, the screw connection element 25 and the supply pipe 26 can be connected to each other, the protective covering 10 according to the invention provided on the outer thread 6 of the screw connection element 25 (FIG. 4), as described with reference to FIG. 2, is pressed together with the sealing means 9 by the inner threaded portion 15 into the threads 8. As is indicated by a reference number 10c in FIG. 3, the part of the protective covering 10 situated in the thread 8a can thereby also remain between the inner and outer threaded portion 15, 6.

Figure 4:
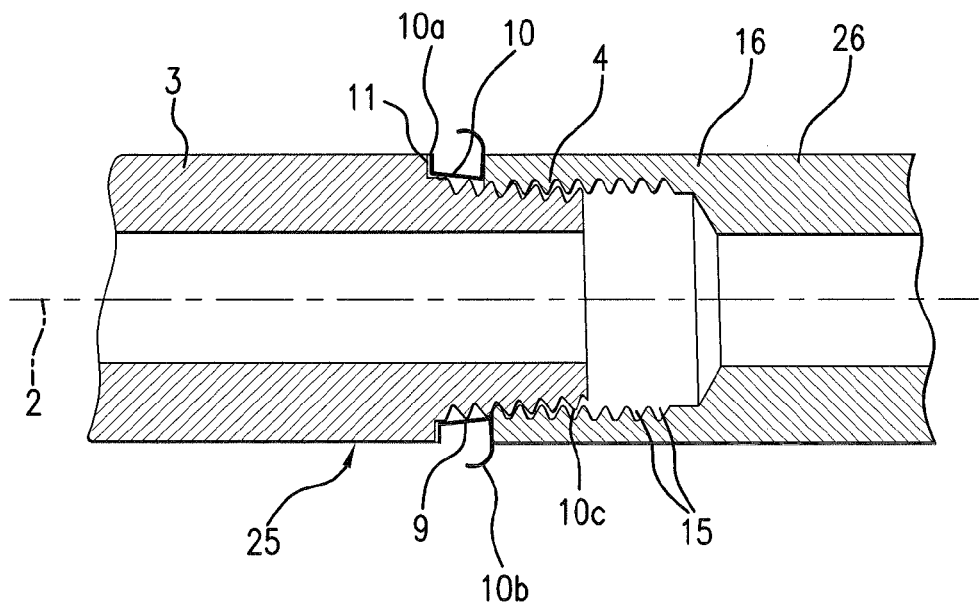
FIG. 4 in a scale reduced relative to FIG. 3, a longitudinal section through a screw connection produced with the screw connection element according to FIG. 3.
Figure 5:
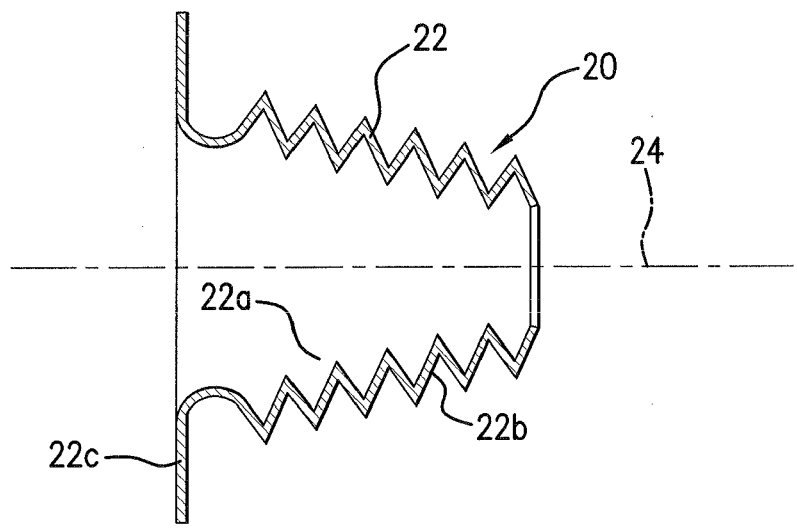
FIGS. 5 and 6 longitudinal sections through an inner and outer part respectively of a protective covering according to the invention.
Figure 6:
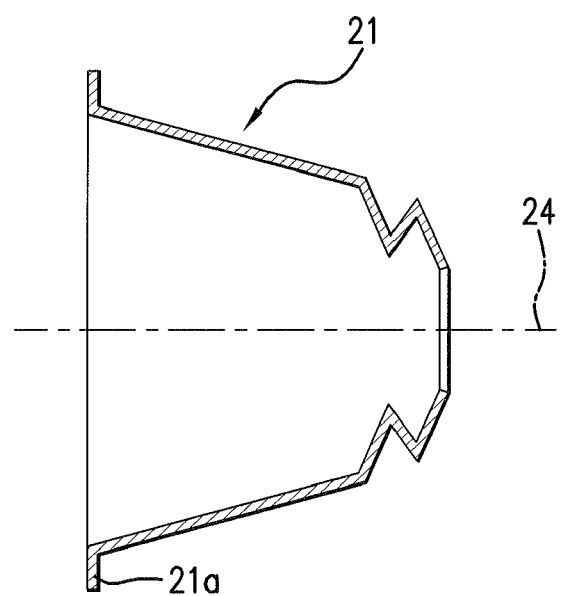
Figure 7:
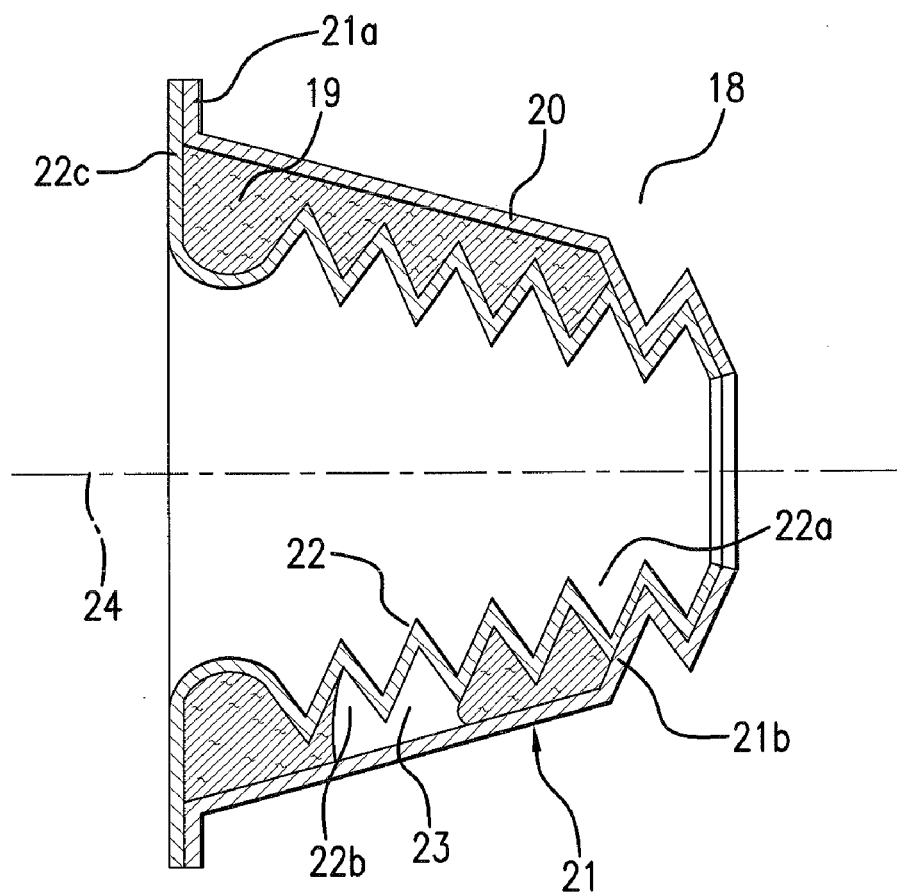
FIG. 7 a protective covering according to the invention assembled from the parts according to FIGS. 3 and 4.

The embodiment according to FIG. 5 to 7 which is considered at present to be the best differs from that of FIG. 1 to 4 in particular in that a protective covering 18 which has a pocket-like configuration is provided (FIG. 7) and a sealing means 19 is integrated into the protective covering 18.

The protective covering 18 according to FIGS. 5 and 7 contains an inner part 20 and according to FIGS. 6 and 7, an outer part 21. The inner part 20 has an inner wall 22 which is adapted to a given outer threaded portion (e.g. the outer threaded portion 6 according to FIG. 1 to 4), on which the protective covering 18 is intended to be secured. The wall thickness of the inner wall 22 is preferably only a few hundredths of a millimeter thick and has a zigzag configuration corresponding to the raised portions and depressions of an outer thread in longitudinal section, as FIG. 5 shows clearly. The inner wall 22 has therefore an internal inner threaded portion with threads 22a adapted to the outer threaded portion of for example the screw connection element 1 and a correspondingly shaped outer threaded portion with threads 22b. At the rear end, the inner wall 22 is provided with a radially outwardly protruding mounting flange 22c which, in the mounted state, is intended to abut for example against the shoulder 11 according to FIG. 1 to 4.

The shape of the outer part 21 corresponds essentially to the shape of the protective covering 10 of FIG. 1 to 4. In contrast thereto, the inner diameter of the outer part 21 is however preferably slightly greater than the outer diameter of the inner part 20 in order that an intermediate space 23 is produced between the two, as is indicated in an opened-up part of FIG. 7. This intermediate space 23 serves as receiving space for the sealing means 19 which, as in the case of FIG. 1 to 4, can comprise hemp fibres or sealing materials chosen dependent upon the application case, said sealing means being inserted in particular into the threads 22b of the inner part 20 formed on the outside of the inner wall 22 and being wound in a helical line in the axial direction. On its rear end, the outer part 21, analogously to FIG. 1 to 4, has a radially outwardly protruding mounting flange 21a, whilst it is provided at the front end, analogously to FIG. 1, with an indentation or bead 21b (FIG. 7).

The outer part 21, after insertion of the sealing means 19 into the threads 22b or the intermediate space 23, is screwed onto the inner part 20 coaxially to a common longitudinal axis 24 until the mounting flanges 22c, 21a abut against each other. Both mounting flanges 22c, 21a can be connected together then by gluing, welding or by another suitable joining method. In addition, the outer part 21, after screwing onto the inner part 20, is provided with the indentation 21b analogously to FIG. 1 to 4, said indentation being provided in an outer thread 22b of the inner part 20 which is free of sealing means 19. In contrast to FIGS. 1 and 2, the sealing means 19 is therefore not directly in the threads of the respective screw connection element 1, on the one hand, but in the threads of the thin inner part 20 whilst, on the other hand, the outer part 21 is fixed not directly on the screw connection element 1 but on correspondingly configured portions of the inner part 20. It is thereby clear that the inner diameter of the outer part 21 corresponds essentially to the outer diameter of the inner part 20 and the intermediate space 23 can therefore be formed essentially by the v-shaped outer threads 22b of the inner part 20.

The protective covering 18 according to FIG. 5 to 7 offers the advantage that it can be screwed subsequently, e.g. on a building site, coaxially onto the outer threaded portions 6 of screw connection elements 1 or 25 of corresponding size. This is desired in particular with repair operations if a connection produced with an already present screw connection element has become unsealed. However, it is also possible as in the case of FIG. 1 to 4, to screw the protective coverings 18 onto the screw connection elements 1 in the factory in order to provide these on the one hand with a factory-applied sealing means 19, on the other hand, to protect said sealing means and also the threads of the screw connection elements 1 during transportation, storage etc.

The inner part 20 is made preferably of a soft flexible material since it is retained after application on an outer threaded portion 6 and is intended to penetrate not only into the threads e.g. of the screw threaded element 1 but as far as possible into all the grooves or the like present in these if, when joining the screw connection, a radially inwardly acting pressure is exerted on the sealing means 19. The outer part 21 can comprise a harder material in contrast as the protective covering 10 according to FIG. 1 to 4, and be torn off when joining the screw connection or be pushed backwards, as is indicated in FIGS. 2 and 4 by the reference number 10b, or remain between the inner and outer threaded portions 15, 6 during joining.

The production of the parts 20 and 21 can be effected essentially in the same manner as described above for the protective covering 10 to be produced separately.

The protective coverings 10 and 18 can have an essentially cylindrical or slightly conical configuration with their portions which can be screwed onto the outer threaded portions 6 or can be adapted in another manner to the thread shapes of the screw connection elements, as can be required for example with screw connection elements which are provided with NPT threads (National Pipe Taper), BSP threads (British Standard Pipe) etc.

The advantage of sealing means made of hemp resides in the fact that hemp swells when it becomes wet and therefore does not have a tendency to become unsealed but if anything effects even greater sealing. In order to increase this effect, the protective coverings 10 and 18 or parts 20, 21 thereof can advantageously be perforated, the outer contours of the holes being able in principle to be selected arbitrarily whereas the expedient size, number and distribution of the holes should be established by means of the individual case and if necessary determined experimentally. Alternatively, also other sealing means, preferably with corresponding properties, can also be used. In the case of FIG. 5 to 7, the application of flowable materials would be conceivable, which can be present also in paste or powder form and be pressed deeply into the threaded portions to be sealed when joining the screw connection.

The invention is not restricted to the described embodiments which could be modified in many ways. This applies in particular to the sizes, materials and shapes of the different parts provided in the individual case.

Furthermore, the expression "screw connection element" should be understood in the widest sense. The screw connection elements according to the invention can be equipped for example for connection to corresponding connection elements. It would be possible furthermore to connect them securely or detachably with threaded portions of pipes, valves, fittings or the like associated with them. It is clear finally that the described sealing means and protective coverings can be applied also on the threaded parts of pipes, valves, fittings etc. which are then combined with any arbitrary screw connection elements which have corresponding threaded portions.

According to a particularly advantageous development of the invention, a sufficient number of thin wires made of copper, silver or another oligodynamically acting metal are mixed in with the hemp fibres or sealing means 9 used in the individual case, being in particular for example interwoven. The advantage is thereby exploited that oligodynamically acting metals restrict the growth of various microorganisms or destroy these microorganisms, as is known for example for copper with respect to algae or silver with respect to mould fungi, algae or bacteria. With materials of this type or different ones which destroy germs and/or bacteria or restrict their growth, the described seals can be made or kept at the same time extensively bacteria- and germ-free in order consequently to fulfil the relevant standards. Instead of fine heavy metal wires, e.g. at most $^2/_{10}$ of a millimeter thick, also heavy metal powders can be used which are mixed in suitable quantities with for example those sealing means 19 which are situated in the pockets formed by the protective coverings 18 according to FIGS. 5 to 7.

As further materials for restricting and/or destroying germs and/or bacteria, different antimicrobial plastic material additives are suitable within the scope of the present invention, such as are sold for example by the company Ciba Speciality Chemistry Lampertheim GmbH with head office in D-68619 Lampertheim under the name "Irgaguard". The material "Irgaguard F 3000" has proved to be best suited here. This material is mixed in with the granulate preferably in powder form, from which, by extrusion firstly the above-described films and, thereafter by deep-drawing of films, the protective coverings 10, 18 are produced. Alternatively, the antimicrobacterial plastic material additive can however also be mixed with the plastic material or cellulose mass from which the protective coverings are produced as moulded parts.

Irrespective of the production method, sealing means, which are enriched with a means which destroys and/or restricts germs and/or bacteria, offer the advantage that they are thought to be hygienically and physiologically safe and suitable in particular for application in the drinking water field. The screw connections according to the invention therefore fulfil specifications, as were issued for example by the DVGW (Deutscher Verein des Gas- und Wasserfaches e.V., Bonn) with respect to the propagation of microorganisms on materials for the drinking water field.

Furthermore, the described protective coverings can be produced and offered in various sizes corresponding to the present standard sizes of normal screw connection elements. However the measures which are indicated by way of example above for securing protective coverings on the screw connection elements or the individual parts of the protective coverings to each other can also be varied respectively according to requirement. Also the production of protective coverings can in principle be varied within wide limits. In addition, it is clear that the protective coverings 10, 18 are provided expediently with introduction slopes at their front ends, i.e. where they are to be screwed into an associated inner threaded portion or are configured in another manner in order to facilitate the introduction process. Finally it is understood that the different features can be applied in combinations other than those described and illustrated.

The invention claimed is:

1. A screw connection element, comprising an outer threaded portion; sealing means disposed in threads of said outer threaded portion; a protective covering surrounding said outer threaded portion for retaining said sealing means in said threads and composed of a flexible material; a thread situated at a front end of said outer threaded portion and free of said sealing means, wherein said protective covering is connected in a form-fitting manner to said thread in an axial direction of said outer threaded portion, wherein said sealing means is enriched with a material selected from the group consisting of a material which restricts a growth of germs, a material which restricts a growth of bacteria, a material which destroys germs and bacteria, and a combination thereof.

2. A screw connection element as defined in claim 1, wherein said material comprises a heavy metal.

3. A screw connection element, comprising an outer threaded portion; sealing means disposed in threads of said outer threaded portion; a protective covering which surrounds said outer threaded portion for retaining said sealing means in said threads and composed of a flexible material, said protective covering including an inner part with an inner wall which is adapted to said outer threaded portion, an outer part which surrounds said inner part and said sealing means disposed between said inner and outer parts, wherein said inner and outer parts are connected to each other in a form-fitting manner at their front ends in an axial direction of said outer threaded portion.

4. A screw connection element as defined in claim 3, wherein said form-fitting connection between said inner part and said outer part is configured by said outer part deformed at the front end so that it enters into a thread of said inner part, while said thread of said inner part is free of said sealing means.

5. A screw connection element as defined in claim 3, wherein said inner part and said outer part are provided at their rear ends with mounting flanges for mutual connection.

6. A screw connection element as defined in claim 5, wherein said sealing means include hemp fibers.

7. A screw connection element as defined in claim 3, wherein said sealing means is enriched with a material selected from the group consisting of a material which restricts a growth of germs, a material which restricts a growth of bacteria, a material which destroys germs and bacteria, and a combination thereof.

8. A protective covering for a screw connection element, provided with an outer threaded portion for receiving a sealing means, the protective covering comprising a sheath for screwing onto the outer threaded portion and containing an inner part with an inner wall having an inner diameter substantially corresponding to an outer diameter of the outer threaded portion, and outer part surrounding said inner part and said sealing means between said inner and said outer part, wherein said inner part and said outer part are connected to each other in a form-fitting manner at their front ends, in an axial direction of said outer threaded portion.

9. A protective covering for a screw connection element as defined in claim 8, wherein said form-fitting connection between said inner part and said outer part is configured as a deformed portion of said outer part at the front end such that it enters into a thread of said inner part, while said thread of said inner part is free of said sealing means.

10. A protective covering for a screw connection element as defined in claim 8, wherein said inner part and said outer part are provided at said rear end with mounting flanges for mutual connection.

11. A protective covering for a screw connection element as defined in claim 8, wherein said sealing means is composed of a material selected from the group consisting of a long fibrous material and a thread-shaped material.

12. A screw connection element as defined in claim 8, wherein said sealing means include hemp fibers.

13. A protective covering for a screw connection element as defined in claim 8, wherein a part selected from the group consisting of said inner part, said outer part, and both contains protein-containing fibers.

14. A protective covering for a screw connection element as defined in claim 8, wherein a part selected from the group consisting of said inner part, said outer part and both contains cellulose.

15. A protective covering for a screw connection element as defined in claim 8, wherein a part selected from the group consisting of said inner part, said outer part and both contains mineral components.

16. A protective covering for a screw connection element as defined in claim 8, wherein a part selected from the group consisting of said inner part, said outer part and both contains respectively at least one polymer.

17. A screw connection element as defined in claim 8, wherein said sealing means is enriched with a material selected from the group consisting of a material which is restricts a growth of germs, a material which restricts a growth of bacteria, a material which destroys germs and bacteria, and a combination thereof.

* * * * *